United States Patent [19]
Yoneyama

[11] 3,763,312
[45] Oct. 2, 1973

[54] OPTICAL SYSTEM FOR PHOTOGRAPHIC FILM TELEVISING APPARATUS

[75] Inventor: Masahide Yoneyama, Kawasaki-shi, Japan

[73] Assignee: Nippon Columbia Kabushikikaisha, Minato-ku, Tokyo, Japan

[22] Filed: Dec. 8, 1971

[21] Appl. No.: 205,808

[30] Foreign Application Priority Data
Dec. 12, 1970 Japan.............................. 45/110907
Dec. 19, 1970 Japan.............................. 45/114885
Dec. 21, 1970 Japan.............................. 45/115481

[52] U.S. Cl. .......................... 178/5.4 ST, 178/5.2 D
[51] Int. Cl. ............................................. H04n 9/06
[58] Field of Search ...................... 178/5.2 R, 5.4 R, 178/5.4 ST; 95/12.2; 355/40

[56] References Cited
UNITED STATES PATENTS
3,664,248   5/1972   Mueller........................... 178/5.2 R Primary Examiner—Richard Murray
Attorney—George B. Oujevolk

[57] ABSTRACT

An optical system for single-tube a photographic film televising apparatus in which Fourier transformation and spatial filter techniques are employed in the optical system for reproducing a monochrome photographic film having encoded color information to improve the S/N ratio and remove beat resulting from the construction of an encoder, so as to produce a high-grade reproduced television picture.

9 Claims, 12 Drawing Figures

PATENTED OCT 2 1973 3,763,312
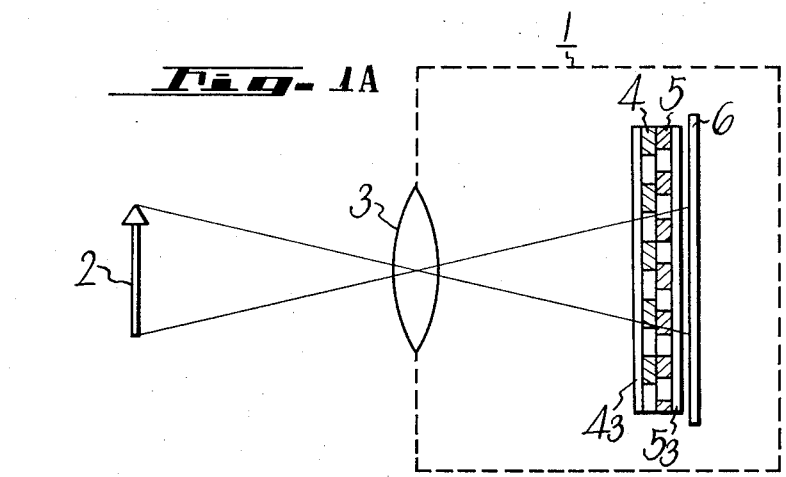
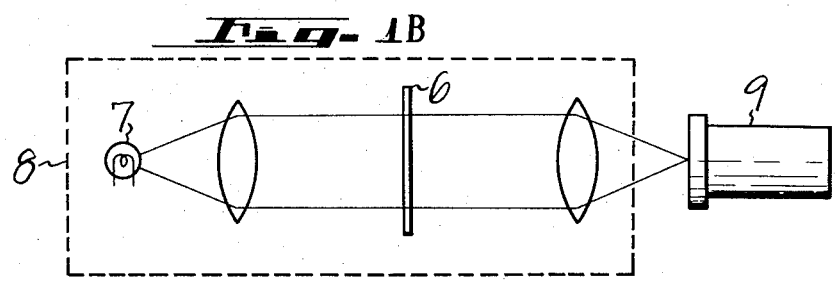
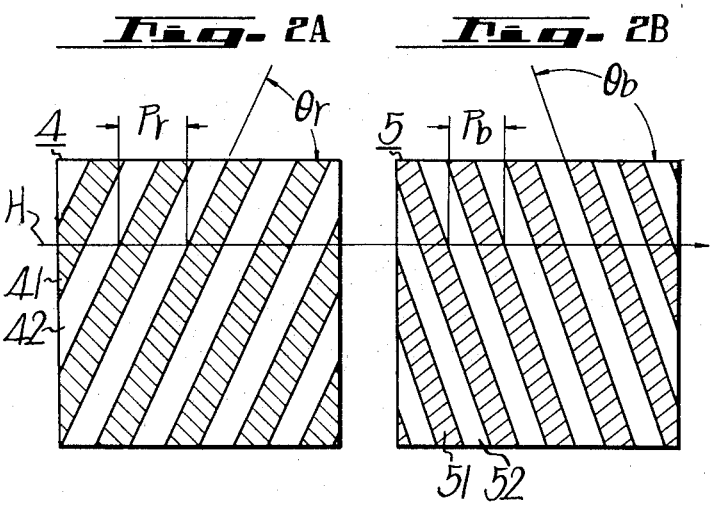
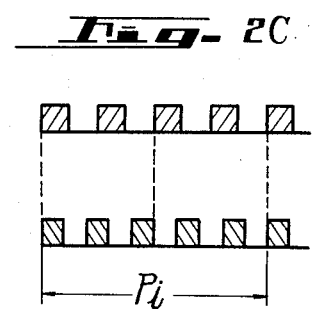
MASAHIDE YONEYAMA
INVENTOR
BY GEORGE B. OUJEVOLK
ATTORNEY

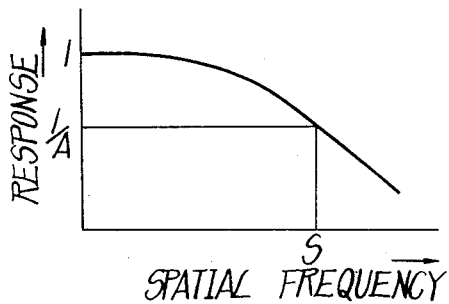
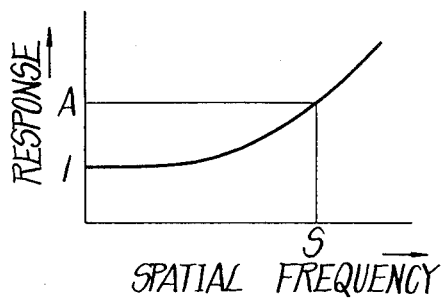
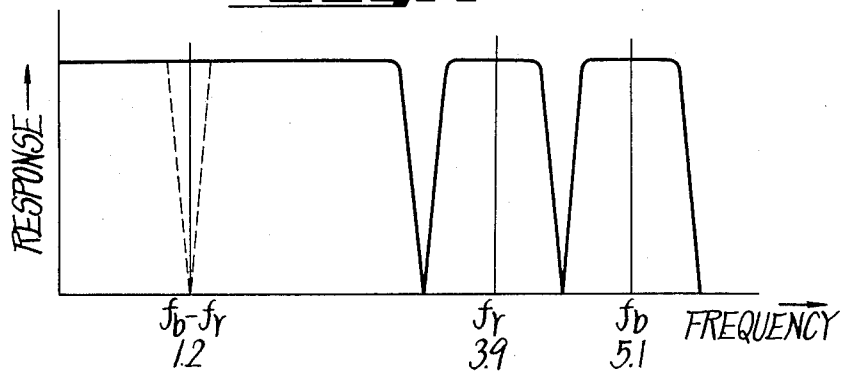
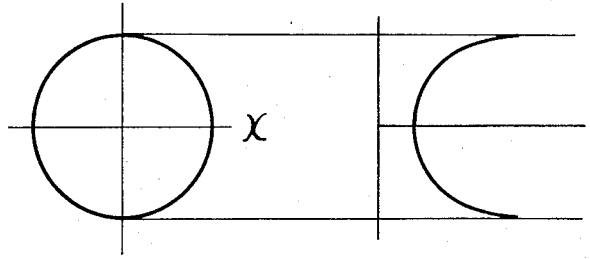

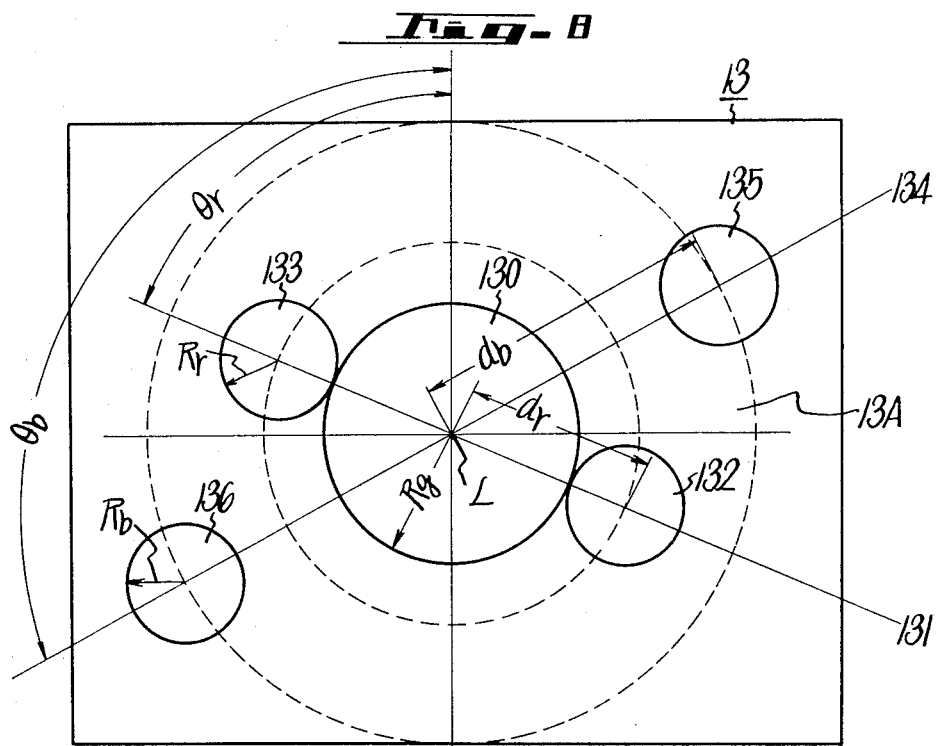
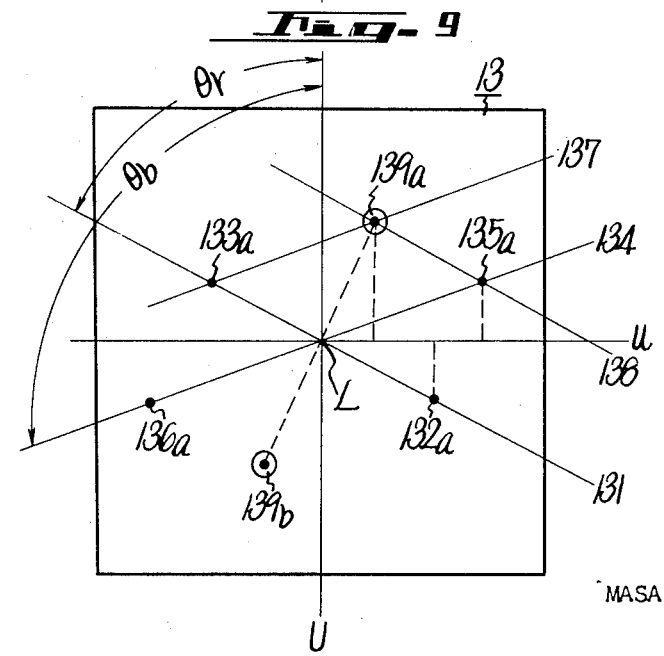

OPTICAL SYSTEM FOR PHOTOGRAPHIC FILM TELEVISING APPARATUS

BACKGROUND OF THE INVENTION

1. Field of the Invention

This invention relates to an optical system for a photographic film televising apparatus, and more particularly to an optical system for reproducing an encoded monochrome film containing encoded color information.

2. Description of the Prior Art

In a reproducing optical system for a convention television film camera, an image of an object recorded on a photographic film is projected onto a target of an image pickup tube of the television camera by means of a film projector having a white light source and converted into a television signal to be reproduced. In this case, the image of the object is picked up and reproduced through various transmission systems, and hence it is subjected to undesirable influences of the transmission characteristics of the transmission systems, which leads to deterioration of the picture quality. A first problem is lowering of the spatial frequency response of the image pickup tube in a high-frequency range. A second problem is lowering of the spatial frequency response of the film which is caused by the optical transfer function of the film itself, the special frequency response of the film being lowered in a high frequency range. A third problem arises from a rear protective glass interposed between the film and an optical modulation grating especially in the case of the monochrome color film. The rear protective glass causes defocusing of the image of the modulation grating on the film, so that it is necessary to make the glass thin but this is limited technically.

In order to compensate for the lowering of the response in the high-frequency range, it is the practice in the prior art that, after the optical image is converted by an image pickup tube into a television signal, the high-frequency component of the signal is emphasized. However, this also emphasizes noise generated by a preamplifier of the camera and discrete noise of high spatial frequency range due to the shape of silver particles of the photographic film, causing a decrease in the S/N ratio.

In a system (hereinafter referred to as a monocolor system) of the type that color information of an object to be televised is recorded on a monochrome film together with luminance information of the object and a color signal is reproduced by a television camera from the film, the pitch of strip filter elements for encoding the color information is selected such that red and blue color carrier frequencies, which are generated by scanning of an optical image of a filter projected on the target of the television camera in accordance with the standard television system, may be, for example, 3.9MHz and 5.1MHz respectively. Usually, two striped filters (red and blue striped filters) are placed one on the other, so that when the optical image projected on the target is scanned a point where red and blue color inhibiting portions agree with each other repeatedly appears on the same scanning line. The repetitive frequency (hereinafter referred to as a beat frequency) of the points is the difference between the aforementioned red and blue color carrier frequencies, that is, for example, 1.2MHz.

Since the aforesaid beat frequency component lies in the frequency band of a luminance signal, it appears as a stripe pattern in the reproduced picture to degrade the picture remarkedly. In the case of employing a band-rejection filter for electrically removing the beat component, necessary luminance signal component is lost to deteriorate the picture quality greatly.

SUMMARY OF THE INVENTION

One object of this invention is to provide an optical system for photographic film apparatus in which the characteristic of an optical image transmission system is corrected by Fourier transformation and spatial filtering treatment with coherent light without deteriorating the S/N ratio.

Another object of this invention is to provide an optical system for photographic film television apparatus in which the spatial frequency response characteristics of an image pickup tube and/or a film are corrected by Fourier transformation and spatial filtering treatment with coherent light without deteriorating the S/N ratio thereby to obtain a high-grade reproduced picture.

Still another object of this invention is to provide an optical system for photographic film television apparatus in which a beat signal component is removed by Fourier transformation and spatial filtering treatment with coherent light without deterioration of the picture quality thereby to obtain a high-grade reproduced picture.

BRIEF DESCRIPTION OF THE DRAWING

FIGS. 1A and 1B are schematic diagrams of a frequency separation type color signal generating device, for explaining this invention;

FIGS. 2A, 2B and 2C are diagrammatic showings of striped filters employed in the device of FIGS. 1A and 1B;

FIG. 3 is a graph showing one example of the spatial frequency response of an optical transmission system such as an image pickup tube, a film or the like;

FIG. 4 is a graph showing one example of a correcting function for correcting the spatial frequency response of the optical transmission system;

FIG. 5 is a graph showing bandpass characteristics, for explaining this invention;

FIG. 7 is a diagram showing one example of the construction of a spatial filter of this invention; and FIGS. 8 and 9 diagrams illustrating other examples of the spatial filter usuable in this invention.

DESCRIPTION OF THE PREFERRED EMBODIMENTS

Figure 6:
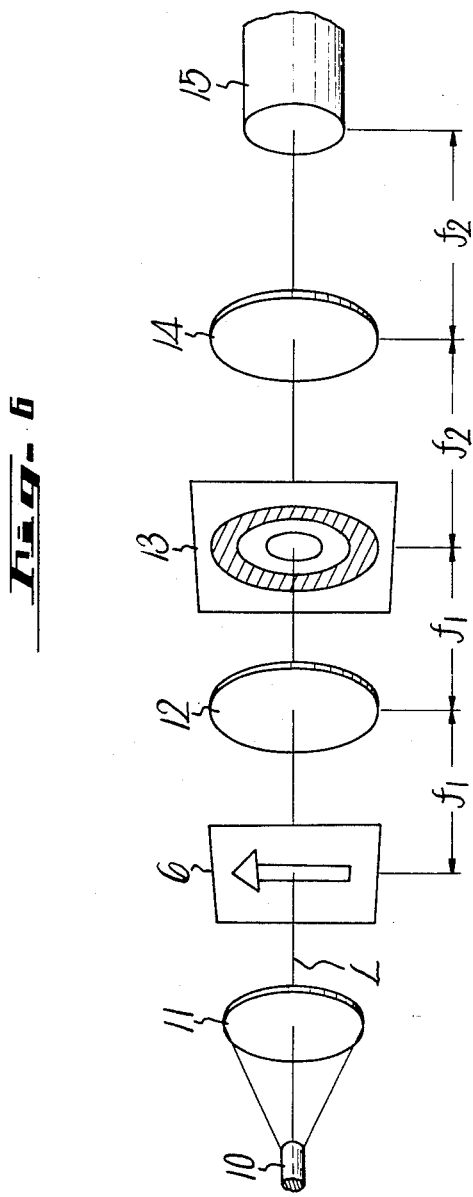
FIG. 6 is a diagram illustrating one example of a reproducing optical system of this invention.

For a better understanding of this invention, a description will be given first of a single-tube color camera of the frequency separation type.

In FIGS. 1A and 1B there is shown the construction of a known color camera of the monocolor system proposed in the U.S. Pat. No. 3,495,518 "Photographic Camera Device" (British Pat. No. 1,160,231 "Photographic Camera Device." With a camera 1, an optical image of an object 2 to be televised is focused through a lens 3 and two striped filters 4 and 5 onto a monochrome photographic film 6 to record thereon a real image of the object 2 together with color informations in the form of monochrome lights and shades of the image. The two striped filters 4 and 5 make up an optical modulation grating and the monochrome photographic film 6 is disposed close to the back of the filter 5. While, in the reproducing system the film 6 with the information recorded thereon as above described is projected onto the target of an image pickup tube 9 of a television camera by means of a film projector 8 having a white light source 7, by which the information is converted into an electric signal and then color signals contained therein are separated by bandpass filters from each other for reproducing.

The constructons of the striped filters 4 and 5 are shown in detail in FIGS. 2A and 2B respectively. The filter 4 consists of strip filter elements 41 inhibiting the passage therethrough of red colored light and strip filter elements 42 permitting the passage therethrough of all colored light. The strip filter elements 41 and 42 are alternately arranged at a repetitive pitch Pr and inclined at an angle $\theta r$ to a horizontal axis H. Similarly, the filter 5 consists of strip filter elements 51 and 52 alternately arranged at a repetitive pitch Pb across a horizontal axis H at an angle $\theta b$ thereto. The strip filter elements 51 inhibit the passage therethrough of blue colored light and the strip filter elements 52 permit the passage therethrough all colored light. The pitches Pr and Pb of the strip filter elements of the striped filters are selected such that red and blue color carrier frequencies, which are generated by scanning the optical image projected onto the target of a television camera in accordance with the standard television system, may be, for example, 3.9MHz and 5.1MHz. The front and back of the striped filters 4 and 5 are protected with transparent glass plates $4_3$ and $5_3$. Namely, the striped filter 4 is formed by arranging the strip filter elements 41 on the back of the transparent glass plate $4_3$ at the pitch Pr and the striped filter 5 is likewise formed by arranging the strip filter elements 51 on the front of the transparent glass plate $5_3$ at the pitch Pb. In practice, the transparent glass plates $4_3$ and $5_3$ perform the function of the aforemantioned filter elements 42 and 52 respectively.

As is well-known, the Fourier transformation spectrum of a diffraction grating is a line of dots spreading out about a ray or light axis on a line perpendicular to the lines of the grating. When the grating is turned in a plane perpendicular to the ray axis, the line of dots turns together with the grating while being held perpendicular to the line of grating. Further, it is also well-known that when the grating and the object are superimposed on each other in the forward focal plane of a transformation lens, a diffraction image of the grating including the spectrum of the object appears in the transformation plane and the spectrum of the object is seen in each light portion of the diffraction image (diffraction order) of the grating.

In the monocolor system, the red and blue color components of the recorded image are an optical image due to superimposition of the striped filters 4 and 5 making up the modulation grating. Accordingly, the spatial frequency spectrum distributions of the red and blue color components are concentrated in the vicinity of areas at which known spatial frequency spectrum distribution of the modulation grating appear but the distribution density of the red and blue color components is low in the other areas. On the other hand, the spatial frequency spectrum of the discrete noise of the film is distributed substantially uniformly in the spatial frequency transmission band of a signal, so that all of noise spectrums in the transmission band exert an influence on the reproduced picture.

While, the green color component of the recorded image has no interrelation to the modulation grating and its spatial frequency spectrum is mainly distributed in a relatively low frequency range within the spatial frequency band, so that the green color component is not greatly affected by the discrete noise of the film.

FIG. 6 shows one example of the construction of the reproducing optical system of this invention. The light source 10 is a source of coherent light such as He-Ne gas laser or the like and rays of light emitted from the light source 10 are rendered by a collimator lens 11 into a beam of parallel rays. Where a recorded encoded monochrome film 6 is placed in the forward focal plane of a second lens 12 having a focal distance $f_1$, a spatial frequency spectrum of amplitude distribution of the film 6 appears in the backward focal plane (Fourier transformation plane) of the lens 12. A spatial frequency filter 13 is disposed in the Fourier transformation plane of the lens 12. When the spectrum image in the Fourier transformation plane of the lens 12 is again subjected to the Fraunhofer's diffraction in the backward focal plane (herein referred to as a reproducing plane) of a third lens 14 of a focal length $f_2$ dioposed in such a manner that the Fourier transformation plane of the lens 12 and the forward focal plane may coincide with each other, an optical image of the film 6 having passed through the spatial filter 13 is obtained in the reproducing plane. The optical image of the film 6 appearing in the reproducing plane is converted into an electric signal by an image pickup tube 15 which is disposed with its image picking up plane coinciding with the reproducing plane. It is needless to say that the above optical means are all aligned on the same ray or light axis L.

In order that the spatial filter 13 disposed in the Fourier transformation plane of the lens 12 may compensate for lowering of the spatial frequency responses of the image pickup 15, and/or the film 6 and the lowering of the spatial frequency response caused by the glass plate $5_3$, it is sufficient only to provide an amplitude transmission factor distribution which is opposite to their spatial frequency response characteristics.

Generally, the spatial frequency response of the image pickup tube is of such a characteristic as shown in FIG. 3 and the response at a spatial frequency S reduces down to 1/A of that in the lower frequency range. The spatial frequency response of the film and the glass plates is of a similar characteristic. Put the spatial frequency response of the image pickup tube $H_1(u, v)$, put that of the film $H_2(u,v)$ and put that due to the thickness of the glass plate $H_3(u, v)$, a correcting function $T(u, v)$ is as follows:

$$T(u,v) = (1/H_1(u,v) \cdot H_2(u,v) \cdot H_3(u,v)) \ldots \ldots \quad (1)$$

Accordingly, the general characteristic of the correcting function $T(u,v)$ is such as shown in FIG. 4, in which the response at the frequency S is A times that in the lower frequency range.

Since co-ordinates in the Fourier transformation plane are proportional to the spatial frequency, a locus of a point of equal effective spatial frequency becomes circular about the ray axis. Put its radius $r$, the following relation holds.

$$r = fls \quad \quad \quad \quad (2)$$

where $f$ is the focal length of the lens, $l$ the wavelength of light and $s$ the effective spatial frequency.

A description will be given in connection with one method for obtaining a spatial filter of such an amplitude transmission factor distribution as above described.

From a grey but transparent material of a transmission factor T per unit thickness such as used for making a neutral density filter for photographic camera, a columnar transparent member is formed which has a relative thickness of 1 at its ray axis and gradually increases its thickness from the ray axis towards its peripheral edge in such a manner as to satisfy the condition that the relative thickness $d$ on the circumference of a radius $r$ about the ray axis defined by the aforementioned equation (2) corresponding to the spatial frequency S is $1/A = T^d$, that is, $$d \log T = -\log A \quad \quad \quad \quad (3)$$

This transparent member is irradiated by parallel rays of light from the direction of its ray axis and the monochrome photographic film is exposed by rays of light having passed through the transparent member. The contrast of the negative film thus obtained is 1 in the vicinity of the ray axis and 1/A on the circumference of the circle with the radius $r$. Namely, the negative film constitutes a spatial filter having a predetermined amplitude transmission factor distribution.

FIG. 7 shows one example of such a spatial filter, which is disposed with its $x$ and $y$ planes coinciding with the Fourier transformation plane of the first optical device and its $x$ axis with its ray axis.

In order to decrease the influence of the discrete noise of the photographic film, use is made of a spatial filter having such an amplitude transmission factor distribution which selectively permits the passage of areas of an image having dense spectrum distribution and inhibits the passage of areas having low spectrum distribution. The use of such a spatial filter enhances the SN ratio of the reproduced picture without decreasing the amount of information of the picture being recorded.

FIG. 8 illustrates one example of the construction of the spatial filter which is employed for decreasing the discrete noise of the film. In the figure, the spatial filter 13 consists of a circular region 130 permitting the passage therethrough of the green color component of the image to be recorded, circular regions 132 and 133 permitting the passage therethrough of the red color component, circular regions 135 and 136 permitting the passage therethrough of the blue color component and light inhibiting region 13A. The center of the region 130 lies on the ray axis L and those of the regions 132, 133, 135 and 136 on a straight line 131 passing through the ray axis L, perpendicular to the red color inhibiting filter elements 41 and crossing a vertical axis at an angle $\theta r$ and on a straight line 134 passing through the ray axis L, perpendicular to the blue color inhibiting filter elements 51 and crossing the vertical axis at an angle $\theta b$ respectively. $\theta r$ and $\theta b$ are the angles between the extending direction of the aforementioned strip filter elements 41 and 51 and the horizontal axis H.

The size of each transmission region and its position relative to the ray axis are determined by the reproducing optical system and the signal transmission frequency band, as previously described.

The distances $d_r$ and $d_b$ between the centers of the red and blue color transmission regions 132, 133, and 135, 136 and the ray axis L are given by the following equations.

$$\left. \begin{array}{l} d_r = f_1 l S_r \\ d_b = f_1 l S_b \end{array} \right\} \quad \quad (4)$$

where $f_1$ is the focal distance of the lens 12, $l$ the wavelength of the coherent light emitted from the light source 10, and $S_r$ and $S_b$ the effective spatial frequencies of the striped filters 4 and 5 respectively.

The radiuses Rg, Rr and Rb of the respective circular transmission regions are related to the transmission bands of the corresponding color television signals and given by the following equations.

$$\left. \begin{array}{l} \text{Rg} = f_1 l k Bg \\ \text{Rr} = f_1 l k Br \\ \text{Rb} = f_1 l k Bb \end{array} \right\} \quad \quad (5)$$

where $k$ is a coefficient of transformation from spatial frequency to time frequency, and $Bg$, $Br$ and $Bb$ transmission band widths of the red, green and blue color component television signals, the band widths being selected, for example, as follows :

$$Bg = 3\text{MHz}$$

$$Br = Bb = 0.4\text{MHz}.$$

With the use of such a spatial filter, it is not necessary to emphasize and amplify the high-frequency component of the signal output derived from the image pickup tube, so that the noise generated by the preamplifier of the camera is not ever emphasized and the discrete noise component of the film can be effectively removed to improve the SN ratio, thus providing a high-grade reproduced picture.

Since the beat component is produced by mutual modulation of the images of both the striped filters, its Fourier spectrum appears at the intersection of two straight lines passing through the points at which Fourier spectrum of modulation grating appears and perpendicular to the grating. However, the spectrum appearing at the intersection of the straight line passing through the point of the primary diffraction comes into problem. Its horizontal co-ordinate corresponds to the difference between the red and blue color carrier frequencies, for example, 1.2MHz. In order to remove this optically, it is sufficient only to prevent that the optical image appearing at the aforementioned position on the Fourier transformation plane is transmitted to the reproducing plane.

FIG. 9 shows one example of a spatial filter employed for this purpose.

In FIG. 9, points 132$a$ and 133$a$ on the straight line 131 are representative of the primary diffraction of the red color inhibiting striped filter 4 and the distances from the ray axis L to them are determined by the equation (2) dependent upon the spatial frequency of the red color inhibiting filter 4. While, points 135a and 136a on the straight line 134 are representative of the primary diffraction of the blue color inhibiting striped filter 5 and the distances from the ray axis L to them are determined by the equation (2) in accordance with the spatial frequency of the blue color inhibiting striped filter 5. A straight line 137 passes through the point 133a and is parallel to the straight line 134 and a straight line 138 passes through the point 135a and is parallel to the straight line 131. The center of a small circle 139a is the intersection of the two straight lines 137 and 138 and its horizontal co-ordinate corresponds to the difference between the red and blue color carrier frequencies as previously described. A small circle 139b is symmetrical with that 139a relative to the ray axis L. The circles 139a and 139b in the spatial filter 13 are light inhibiting regions and the remaining regions are light transparent regions.

With the provision of the spatial filter of the above construction in the Fourier transformation plane of the reproducing optical system, only harmful beat components can be removed without affecting any influence on required luminance signal component, thereby to provide for enhanced picture quality.

It will be apparent that many modifications and variations may be effected without departing from the scope of the novel concepts of this invention.

I claim as my invention:

1. In a television image transmission system including a television camera having an image pickup tube with a predetermined spatial frequency response and wherein the image of an object is recorded on a monochromic photographic film with a single color light emitted from a point light source, said monochromic photographic film having recorded thereon luminance information and a plurality of color information of the object image, said image of the object having been recorded on said film after passing through an optical modulation grating consisting of a plurality of strip filter elements of different frequency characteristics, in combination:
   a. a first optical means defining a Fourier transformation plane for Fourier transformation of said image;
   b. a spatial filter disposed on the Fourier transformation plane of said first optical means, said spatial filter having an amplitude transmission factor distribution which is the reciprocal of the spatial frequency response of said image pickup tube; and,
   c. a second optical means defining a plane for inverse Fourier transformation of the spatial frequency spectrum obtained from the first optical means, said television camera being disposed opposite said second optical means for picking up an optical image formed on the Fourier transformation plane of said second optical means.

2. An optical system for photographic film televising apparatus as claimed in claim 1, wherein the spatial filter has an amplitude transmission factor distribution which is a reciprocal of a special frequency responses of the photographic film.

3. An optical system for photographic film televising apparatus as claimed in claim 2, in which the amplitude transmission factor distribution is determined by the pitches of the strip filter elements of the optical modulation grating and the transmission characteristic of a television signal corresponding to the color characteristics of the strip filter elements.

4. An optical system for photographic film television apparatus as claimed in claim 3 in which the spatial filter has a first circular region permitting passage therethrough of a green color component from the image, a second circular region permitting passage therethrough of a red color component, a third circular region permitting passage therethrough of a blue color component and a light inhibiting region.

5. An optical system for photographic film television apparatus as claimed in claim 4 in which the first region is disposed on the ray axis and said second and third regions are disposed on different distances from the ray axis.

6. An optical system for photographic film televising apparatus as claimed in claim 2, in which the amplitude transmission factor distribution cuts off mutual modulation component determined by the pitch of the strip filter elements of the optical modulation grating.

7. An optical system for photographic film television apparatus as claimed in claim 6 in which the spatial filter includes two regions, one of which passes therethrough all color lights but the other of which inhbiits passage of all color lights therethrough.

8. An optical system for photographic film television apparatus as claimed in claim 7 in which the region inhibiting passage therethrough of all color lights consists of two circles disposed symmetrical with respect to the ray axis.

9. An optical system for photographic film television apparatus as claimed in claim 8 in which one of said two circles is disposed with its center on the intersection of two lines, one of which passes through a point representing the primary diffraction of a red color inhibiting striped filter element and the other of which passes through a point representing the primary diffraction of a blue color inhibiting striped filter element.

* * * * *